(12) United States Patent
Molisch et al.

(10) Patent No.: US 7,356,100 B2
(45) Date of Patent: Apr. 8, 2008

(54) ESTIMATING CHANNEL IMPULSE RESPONSE AND EQUALIZER COEFFICIENTS IN UWB COMMUNICATION SYSTEMS

(75) Inventors: Andreas Molisch, Arlington, MA (US); Ye Li, Marietta, GA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 569 days.

(21) Appl. No.: 10/616,875

(22) Filed: Jul. 10, 2003

(65) Prior Publication Data

US 2004/0185787 A1 Sep. 23, 2004

Related U.S. Application Data

(60) Provisional application No. 60/451,528, filed on Mar. 3, 2003.

(51) Int. Cl.
*H04L 27/06* (2006.01)
*H04B 1/00* (2006.01)

(52) U.S. Cl. .................. 375/343; 375/340; 375/349; 375/239; 375/229; 375/136

(58) Field of Classification Search ............. 375/295, 375/303, 324, 340, 130, 329, 148, 149, 343, 375/239, 150, 138, 242, 247, 147, 203, 256, 375/355, 367
See application file for complete search history.

(56) References Cited

U.S. PATENT DOCUMENTS

| | | | |
|---|---|---|---|
| 5,648,983 A * | 7/1997 | Kostic et al. ............. 375/150 |
| 6,215,814 B1 * | 4/2001 | Ylitalo et al. ............ 375/148 |
| 6,266,365 B1 * | 7/2001 | Wang et al. .............. 375/150 |
| 6,442,193 B1 * | 8/2002 | Hirsch .................. 375/147 |
| 6,456,647 B1 * | 9/2002 | Banister ................. 375/142 |
| 6,570,918 B1 * | 5/2003 | Rademacher ............. 375/232 |
| 6,853,689 B1 * | 2/2005 | Nilsson ................. 375/267 |
| 6,856,646 B2 * | 2/2005 | Carbone et al. .......... 375/143 |
| 7,079,604 B1 * | 7/2006 | Miller et al. ............ 375/343 |
| 7,116,998 B2 * | 10/2006 | Wang et al. ............. 455/506 |
| 7,248,622 B2 * | 7/2007 | Sathiavageeswaran et al. .................. 375/147 |
| 2002/0191568 A1 * | 12/2002 | Ghosh .................. 370/335 |
| 2003/0227961 A1 * | 12/2003 | Batra et al. ............ 375/147 |
| 2003/0232612 A1 * | 12/2003 | Richards et al. ......... 455/323 |
| 2004/0097204 A1 * | 5/2004 | Jung et al. ............. 455/132 |
| 2004/0141559 A1 * | 7/2004 | Tewfik et al. ........... 375/248 |
| 2007/0183535 A1 * | 8/2007 | Maravic et al. .......... 375/316 |

OTHER PUBLICATIONS

Namgoong "A Channelized DSSS Ultra-Wideband Receiver" IEEE 2001.*
Won Namgoong "A Channelized DSSS Ultra-Wideband Receiver", IEEE 2001.*

* cited by examiner

*Primary Examiner*—Mohammed Ghayour
*Assistant Examiner*—Sophia Vlahos
(74) *Attorney, Agent, or Firm*—Dirk Brinkman; Clifton D. Mueller; Gene V. Vinokur (57) ABSTRACT

A method estimates a channel impulse response in an ultra wide bandwidth (UWB) system. Multiple training sequences modulated at a chip rate are received. Each training sequence is sampled by parallel with multiple correlators at sampling rate substantially slower than the chip rate to obtain a samples over a time interval of the impulse response at a resolution substantially equal to the chip rate, and then estimating the channel impulse response from these samples.

12 Claims, 8 Drawing Sheets

ESTIMATING CHANNEL IMPULSE RESPONSE AND EQUALIZER COEFFICIENTS IN UWB COMMUNICATION SYSTEMS

CROSS-REFERENCE TO RELATED APPLICATIONS

A claim of priority is made to U.S. Provisional Patent Application Ser. No. 60/451,528, filed Mar. 3, 2003, entitled "Channel Estimation and Equalizer Coefficient Estimation for UWB Radio Communication Systems."

FIELD OF THE INVENTION

The present invention relates generally to radio communication systems, and more particularly to channel and equalization estimation in an ultra wide bandwidth communications systems.

BACKGROUND OF THE INVENTION

With the release of the "First Report and Order," Feb. 14, 2002, by the Federal Communications Commission (FCC), interest in ultra wide bandwidth (UWB) communication systems has increased. The IEEE 802.15 standards organization, which is responsible for Personal Area Networks, has established a task group, TG3a, to standardize a high-data-rate physical layer based on UWB.

Ultra wide bandwidth (UWB) communication systems transmit and receive extremely short electromagnetic energy impulses, therefore the terms "UWB" and "impulse radio" are used synonymously herein. Because the bandwidth of the pulses is much wider than the bandwidth of the payload signal, UWB is a form of spread-spectrum communication. Each pulse can cover anywhere from 500 MHz to several GHz of the radio spectrum.

Information is transmitted by modulating the frequency, timing, amplitude, polarity, or other aspect of the pulses. UWB systems can provide very high data rates for short-range wireless communications. In part, UWB systems are designed to distribute information in home, office, school, and industrial environments using high-speed links between computer devices.

However, it is a challenge to realize UWB modulation schemes that increase data throughput while minimizing errors in dense multi-path environments. Propagation measurements and channel modeling studies indicate that many multi-path components (MPCs) are expected for an UWB radio link. In a dense multi-path environment, the number of MPCs increases linearly with the bandwidth.

For example, a system with a 10 GHz bandwidth, operating in an environment with a maximum excess delay spread of 100 ns requires a thousand fingers in a rake receiver. Even in a sparse multi-path environment, like the channels specified by the IEEE 802.15.3a standard for channel models, up to 80 fingers are required to collect 80% of the available energy.

In order to collect most of the available energy from MPCs, while at the same time reducing the number of fingers in the rake receiver, it is desired to estimate the channel impulse response so that the correct reference waveforms for convolutions with the received signal at each rake finger can be determined.

The requirements for channel estimation in the IEEE 802.15.3a standard for data format are stringent. Data are to be transmitted in blocks of 8,000 bits. It is also assumed that the channel can change from block to block. Each block of data lasts only 0.1 ms. The typical speed of movement in an indoor environment is about 1 meter per second, so for a 10 GHz upper frequency limit, the maximum Doppler frequency is 30 Hz. Thus, the channel stays stationary for only 30 ms.

The impulse responses can last up to 200 ns, as can be seen in the Final Report and Order. Because sampling has to be done at a rate of about 10 G samples per second, this means that 2000 samples of the channel impulse response have to be evaluated. If data are transmitted in a constant stream, then is should be possible to exploit the correlation between channel realizations.

In the prior art, the channel impulse response and equalizer coefficient are usually estimated from a single pseudo-noise (PN) training sequence. However, other users and out-of-band interferers might be transmitting while the single training sequence is transmitted. Therefore, there is a need to suppress co-channel interferers. This can be done by spreading the training sequence.

A brute-force approach samples and A/D converts the measured impulse response at a speed of 10 G samples per second. In principle, the channel sounding requires only two microseconds, i.e., the length of the impulse response times a factor of 10 for the interference suppression, which is 200 symbol durations. This is much shorter than the duration of the data block, and thus is not a significant overhead. However, A/D converters that can process 10,000,000,000 samples per second are prohibitively expensive.

During the estimation period, while the single training sequence is transmitted, it is necessary to sample the received signal at a chip rate to find the delays and amplitudes of the received multi-path components. Because the number of MPCs is not yet known at this time, each possible resolvable delay, i.e., each chip period, must be estimated. For a 10 GHz system, that again means sampling and A/D converting at 10 G samples/s, which is prohibitively expensive.

Therefore, there is a need for method and system that can estimate the channel impulse response and equalizer coefficient at a lower cost without degrading performance.

SUMMARY OF THE INVENTION

It is an object of the invention to provide a low cost channel estimator that can estimate the channel impulse response and equalizer coefficients in an ultra wide bandwidth (UWB) communications system.

According to the present invention, multiple training sequences are transmitted. Each training sequence includes, for example, fifteen symbols, and the training sequence is repeated, for example, fourteen times to suppress interference. There is a guard interval between two consecutive training sequences to avoid inter-sequence interference. Each symbol is 'spread' over the spectrum by a predetermined sequence of chips at a chip rate.

After front-end processing, the UWB signal of the training sequences is passed to a rake-like receiver structure with a small number of parallel correlators (fingers), for example, three, for channel impulse response estimation.

The fingers sample each received training sequence, in parallel, with different time offset to produce samples. The samples substantially span the entire time interval of the impulse response. If the training sequence is repeated, then the samples have a fine resolution, and the channel impulse response can be estimated from the transmitted signal and the samples.

After the channel has been estimated, the weights for the rake receiver used for the data reception are determined. Finally, equalizer coefficients are estimated by minimizing the error between equalized outputs and the equalizer training sequence.

DETAILED DESCRIPTION OF THE PREFERRED EMBODIMENT

System Structure and Operation

Figure 6:
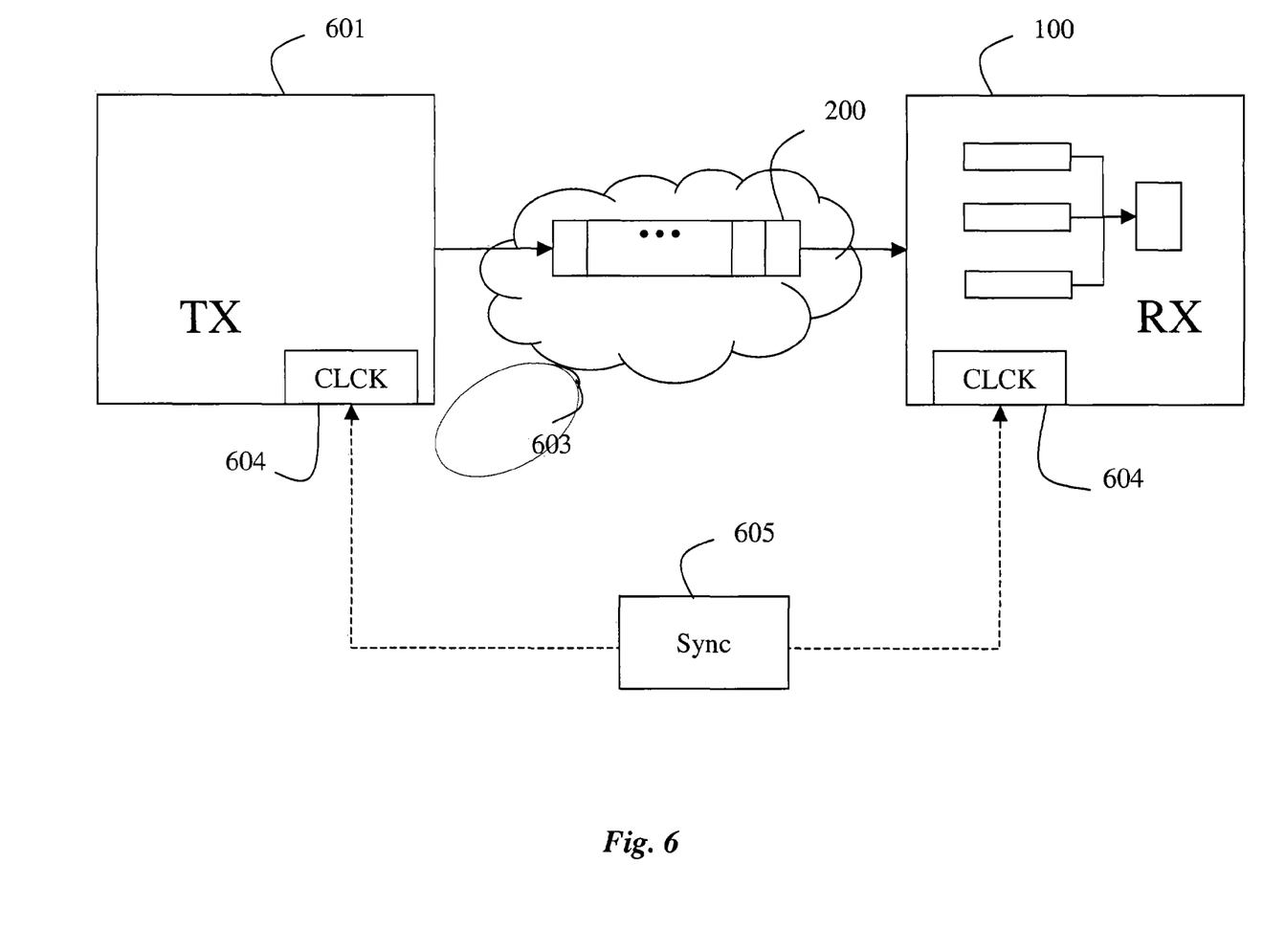
FIG. 6 is a block diagram of a UWB system according to the invention.

FIG. 6 shows a UWB system according to the invention. The system includes a transmitter 601 and a rake-like receiver 100 connected via a wireless channel 603. Both the transmitter and the receiver include a clock (CLCK) 604. The clocks are synchronized 605 to each other. The details of how this is achieved can vary, see, e.g., Meyr et al., *Synchronization, Channel Estimation, and Signal Processing*, Volume 2, Digital Communication Receivers, Wiley, 1997. The transmitter sends m training sequences 200 as described in detail below. The pulses of the training sequences are modulated at a chip rate.

Figure 7:
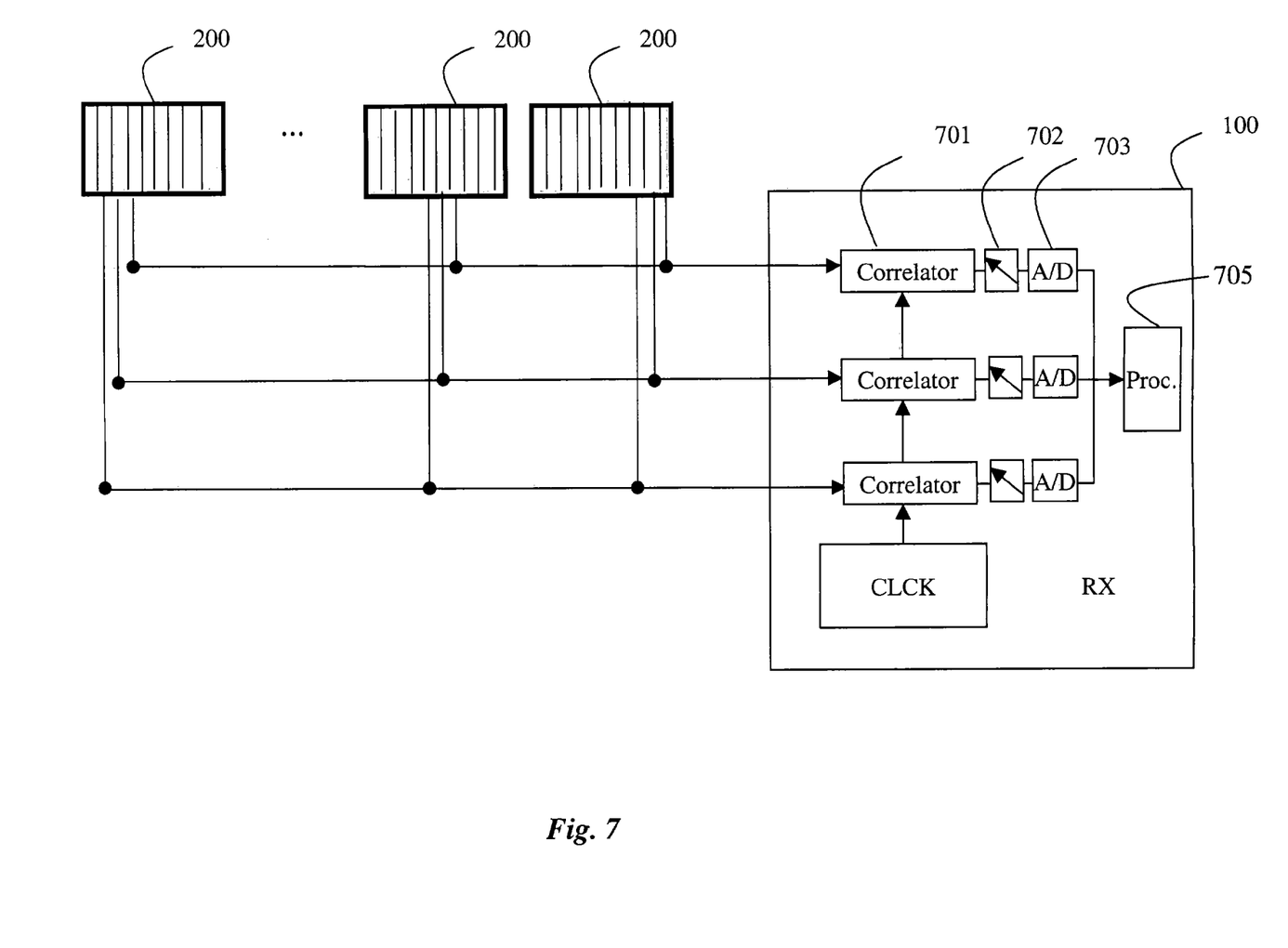
FIG. 7 is a block diagram of a UWB receiver according to the invention.

As shown in FIG. 7, each of the m training sequences 200 is passed, in parallel, through multiple correlators 701 (rake fingers) of the receiver 100. Parallel "sample and hold" circuits 702 sample each received training circuits at multiple delay points with fixed offsets to obtain at least one (k=1) sample for each training sequence. It should be noted that each of the n fingers can also obtain serially more samples (k>1). Thus, the total number of samples can be expressed as (m×n×k). The idea is that these samples span a time interval corresponding to the impulse response at a resolution that is substantially equal to the chip rate.

However, the actual sampling rate according to the invention is at a substantially lower rate then the prior art sampling at the chip rate (on the order of 10 GHz) because the sampling extends over a longer period of time of the multiple training sequences. In fact, the sampling rate can be at the symbol rate (110 MHz in an 802.15.3a system). It should be understood that the sampling can also be at other low sampling rates. Thus, low cost components can be used for the receiver according to the invention, and the primary object of the invention is achieved.

After the sampling, the analog signal is A/D converted 703 to a digital signal. The (m×n×k) digital signals from the fingers are further processed 705 to determine the channel impulse response.

In a second, optional, step, the estimate of the channel impulse response is then used to determine the weights of the rake receiver. For the basic prior art method see Molisch, *Wideband Wireless Digital Communications*, Prentice-Hall, 2001.

The rake coefficients are then used to weigh the output of the correlators 701 so that most of the available energy of the signal can be acquired. Thus, the invention estimates an "effective channel" from the antenna of the transmitter to the output of the summation device. Optionally, additional training sequences can be sampled at the symbol rate to provide an estimate of the channel impulse response of the effective channel, which, in turn, is the basis for the determination of the coefficients of an equalizer. The low rate samples are thus used to determine a full-resolution impulse response of the channel, and equalizer coefficients for the receiver. All of this is now described in greater detail.

Signaling Format

In the transmitter, symbols are generated at a symbol rate $1/T_s$. Transmitted pulses p corresponding the symbols are in the form of a Gaussian function $$p(t) = K_1 e^{-\frac{t^2}{2\sigma^2}},$$

whose Fourier transform is $$P(\omega) = K_2 e^{-\frac{\sigma^2 \omega^2}{2}}.$$

In this example, the variance $\sigma^2$ is determined by $$\frac{\int_{-2\pi f_0}^{2\pi f_0} |P(\omega)|^2 d\omega}{\int_{-\infty}^{\infty} |P(\omega)|^2 d\omega},$$

where f is the frequency. From p(t), the spreading waveform can be obtained by $$w(t) = \sum_{k=0}^{N_f} s_k p(t - kT_c),$$

where $1/T_c$ is the chip rate, which is substantially faster than the symbol rate. An example spreading sequence is $\{s_k\} = \{-1 -1 -1 +1 +1 -1 +1 +1\}$. If the symbol sequence to be transmitted is $\{b_k\}$, then the transmitted signal can be expressed as $$s(t) = \sum_{k=-\infty}^{\infty} b_k w(t - kT_s).$$

Detailed Receiver Structure

Figure 1:
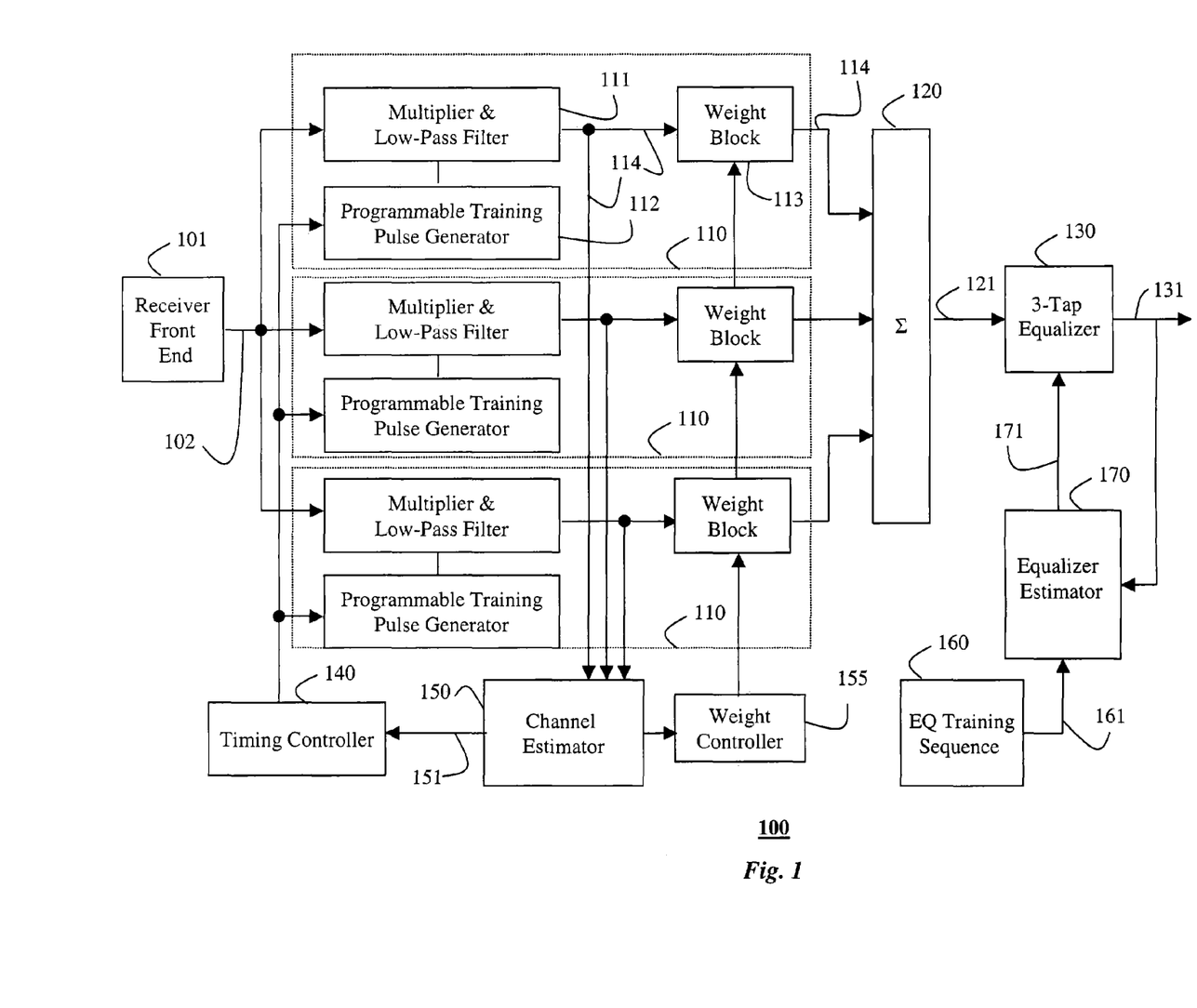
FIG. 1 is a detailed block diagram of a receiver with channel impulse response and equalizer coefficients estimation according to the invention.

FIG. 1 shows the rake-like receiver 100 according to the invention in greater detail. The receiver includes a conventional front-end 101 and three fingers 110 to acquire most of the available energy of a received signal 102. Each finger 110 includes a multiplier and low-pass filter 111, a programmable training pulse generator 112. These comprise the correlators 701 and sample and hold circuits 702 of FIG. 7.

Adjustable weight blocks 113 operate on digital signals 114. For clarity the details of the sampling and A/D circuits of Figure are not shown here. The digital signal is functionally related to a product of the output of the front end and the output of the programmable pulse generator.

The receiver also includes a timing controller 140 for the programmable training pulse generators 112. A channel estimator 150 provides input for the timing controller and an estimate 151 of the channel impulse response, which is used by the timing controller 140. A weight controller 155 adjusts the weights of the weight blocks 113 of each finger according to the estimated channel impulse response. An equalizer (EQ) training sequence generator 160 generates an equalizer training sequence 161 for an equalizer estimator 170 that produces coefficients 171 for a three-tap equalizer 130. The receiver produces output 131 is also fed back to the equalizer estimator.

After summing 120, a combined output 121 can be expressed as $$x[n] = \sum_{k=0}^{3} \gamma_{n_k}^* \int s(nT_s + \tau + n_k \Delta) w^*(\tau) d\tau,$$

$$= \sum_{k=0}^{3} \gamma_{n_k}^* r(nT_s + n_k \Delta),$$

where $r(t) = \int s(t+\tau)w^*(\tau)d\tau$, $\lambda_k$ is the impulse response of the channel at $n_0 \Delta$, where $\Delta$ is a minimum timing offset between two fingers.

To acquire as most of the available energy, we select $\{n_1, n_2, n_3\}$ such that $\{\gamma_{n_1}, \gamma_{n_2}, \gamma_{n_3}\}$ correspond to the three taps with largest energy magnitudes.

The three-tap linear equalizer 130 is used to mitigate residual inter-symbol-interference (ISI). If the coefficients of the equalizer are $\{c_{-1}, c_0, c_1\}$, then the equalizer output 131 is $$\tilde{b}_n = \sum_{k=-1}^{1} c_k x[n-k].$$

To optimize performance, the equalizer coefficients 171 are selected to minimize a mean square-error of its output, that is $$MSE = E|\tilde{b}_n - b_n|^2.$$

Channel Estimation and Equalizer Coefficient Estimation Training Sequences

Figure 2:
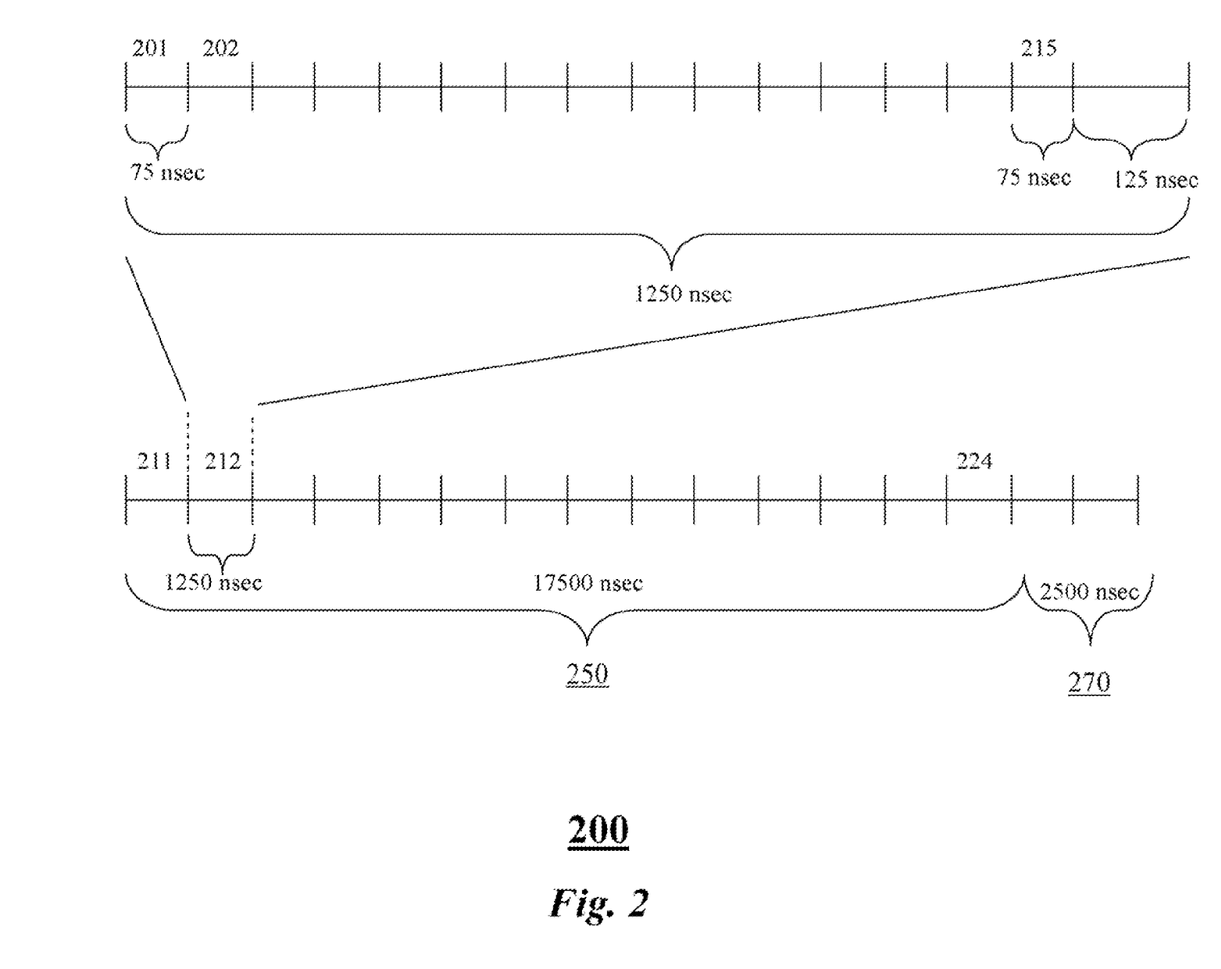
FIG. 2 is a timing diagram of multiple training sequences according to the invention.

FIG. 2 shows the structure of the m pseudo-noise (PN) training sequences 200 according to the invention. Each of the multiple training sequences uses fifteen symbols 201-215. Each symbol is 75 nsec in duration, followed by a guard interval of 125 usec, for a total of 1250 nsec. If the sequence is repeated fourteen times 211-224, then the channel coefficients can be estimated in 17.5 μsec 250, followed by 2.5 μsec 270 for equalizer coefficients estimation, for a total of 20 μsec. The sequences can be the same or different.

Channel Impulse Response Estimation

Each training sequences are sampled, in parallel, at a symbol rate ($1/T_s$). During each symbol period, we observe at least n samples, e.g., three if there are three fingers. Because we need to estimate the entire impulse response at a resolution of the chip rate, we need forty samples during the symbol interval. Therefore, we repeat the training sequence fourteen (40/3) times. The timing offset of each finger can be adjusted by the controller 140 so that the output of each finger is as indicated in Table A below.

TABLE A

| Sequence No. | Output of the 1st finger | Output of the 2nd finger | Output of the 3rd finger |
|---|---|---|---|
| 1 | r(40nΔ) | r(40nΔ + 14Δ) | r(40nΔ + 28Δ) |
| 2 | r(40nΔ + Δ) | r(40nΔ + 15Δ) | r(40nΔ + 29Δ) |
| 3 | r(40nΔ + 2Δ) | r(40nΔ + 16Δ) | r(40nΔ + 30Δ) |
| 4 | r(40nΔ + 3Δ) | r(40nΔ + 17Δ) | r(40nΔ + 31Δ) |
| 5 | r(40nΔ + 4Δ) | r(40nΔ + 18Δ) | r(40nΔ + 32Δ) |
| 6 | r(40nΔ + 5Δ) | r(40nΔ + 19Δ) | r(40nΔ + 33Δ) |
| 7 | r(40nΔ + 6Δ) | r(40nΔ + 20Δ) | r(40nΔ + 34Δ) |
| 8 | r(40nΔ + 7Δ) | r(40nΔ + 21Δ) | r(40nΔ + 35Δ) |
| 9 | r(40nΔ + 8Δ) | r(40nΔ + 22Δ) | r(40nΔ + 36Δ) |
| 10 | r(40nΔ + 9Δ) | r(40nΔ + 23Δ) | r(40nΔ + 37Δ) |
| 11 | r(40nΔ + 10Δ) | r(40nΔ + 24Δ) | r(40nΔ + 38Δ) |
| 12 | r(40nΔ + 11Δ) | r(40nΔ + 25Δ) | r(40nΔ + 39Δ) |
| 13 | r(40nΔ + 12Δ) | r(40nΔ + 26Δ) | |
| 14 | r(40nΔ + 13Δ) | r(40nΔ + 27Δ) | |

If the training sequence $bt_k$'s for k=0, 1, ..., 14, then the training sequence can be expressed as $$st(t) = \sum_{k=0}^{14} bt_k w(t - kT_s),$$

and the channel output is $xt(t) = h(t)*st(t) + nt$, where $h(t)$ is the channel's impulse response and $n(t)$ is additive white Gaussian noise.

The Δ-sampled output of each correlator is $r(n\Delta) = \int xt(n\Delta + \tau) st^*(\tau) d\tau$. If the training sequence $st(t)$ is white, then the channel parameters can be estimated by $$h(n\Delta) \approx \frac{r(n\Delta)}{\|st(t)\|^2}.$$

However, st(t) is not perfectly white. Therefore, we modify the above estimation by the following discrete Fourier transform (DFT) steps:

1) Find the DFT of $h(n\Delta)$, $H_k = DFT\{h(n\Delta)\}$.
2) Find the DFT of $st(t)$, $St_k = DFT\{st(n\Delta)\}$.
3) Modify the DFT of $h(n\Delta)$ by i.

$$\hat{H}_k = \frac{H_k}{|St_k|^2 + \rho^2}$$

4) Find the modified channel estimation by $\hat{h}(n\Delta) = I-DFT\{H_k\}$.

Improved Channel Estimation

Figure 3:
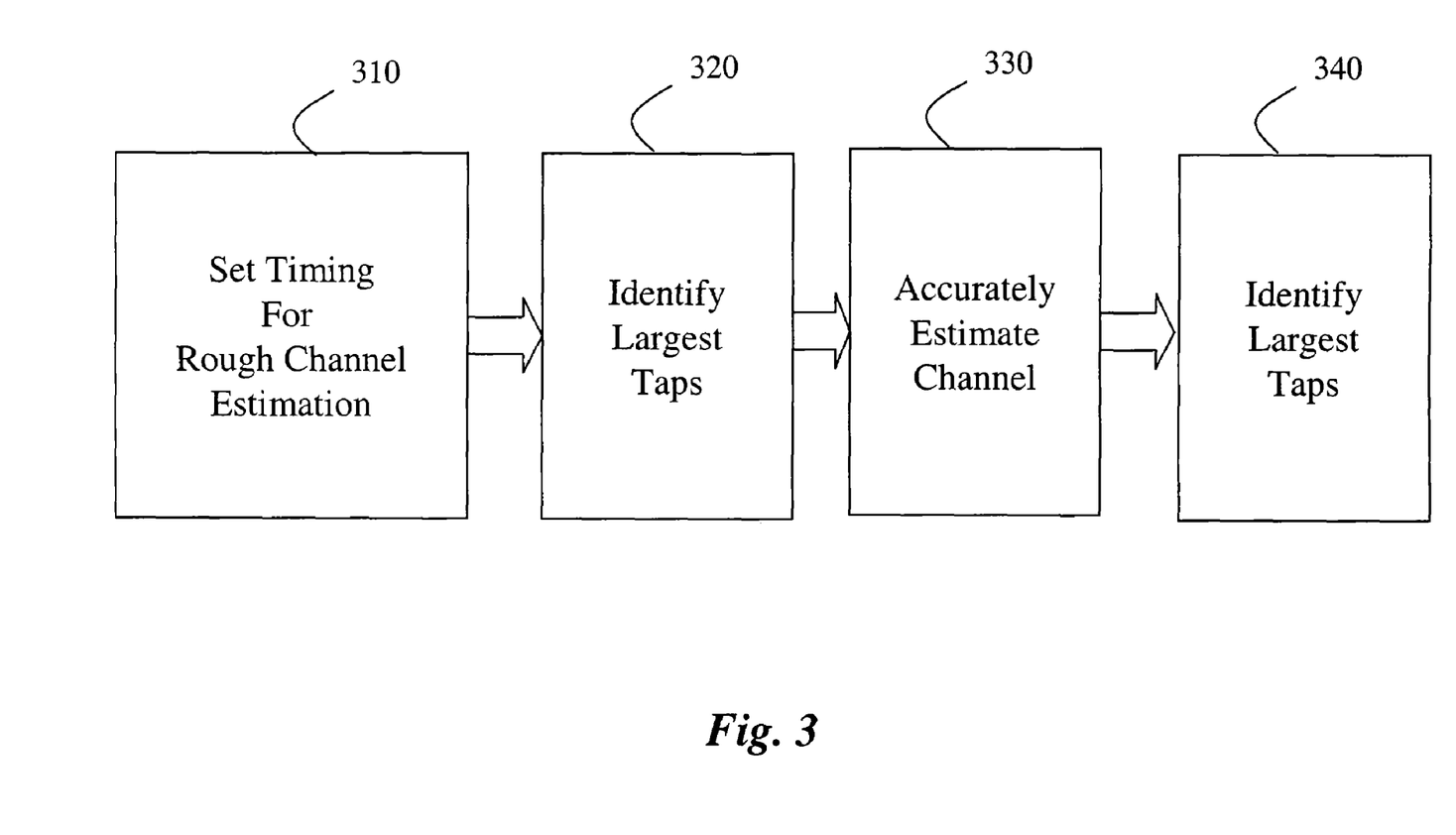
FIG. 3 is a flow diagram of a method for the estimating according to the invention.

Because the channel impulse response is correlated for the sub-channels, the estimation of the channel impulse response can be improved, as shown in FIG. 3. For the first few, e.g., two, training sequences, set the timing offsets of the rake fingers of different sub-channels for rough channel estimation 310. This locates the portions of the impulse response that contain most of the available energy. Identify 320 the largest (six) taps according to the rough channel estimation. That is, set the offset timing so as to only sample near the rough estimates, instead of over the entire span of the impulse response. Then, estimate 340 the impulse response more accurately using another four training periods or 5000 nsec, and identify 350 the largest three taps from the six taps for the rake receiver and channel equalization.

Figure 8:
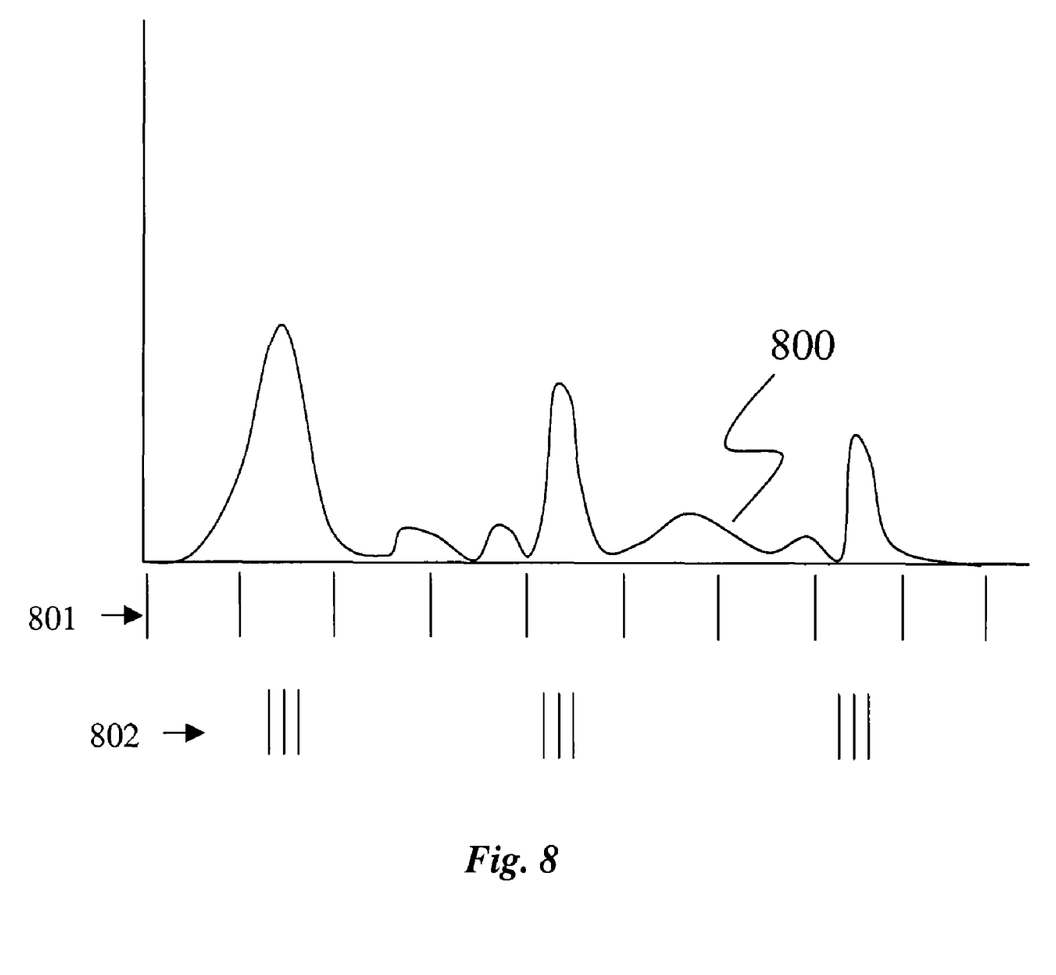
FIG. 8 is timing diagram of rough and accurate estimates of an impulse response according to the invention.

As shown in FIG. 8, the rough estimates 801 for an impulse response 800, are used as a basis for the accurate estimates 802. Obviously, the rough to accurate refinement can be done in any number of steps.

It should be noted that more then one sample can be acquired concurrently by each rake finger for each training sequence. For example, if k (two or more) samples are taken at different time offsets, for each sequence, then the number of required sequences can reduced.

This simplified estimator only needs six training sequences instead of fourteen, which only requires 7500 nsec. Together with another 2500 nsec for equalizer coefficient estimation, the overall simplified estimation takes is only 10 usec, which is half the time required to estimate the channel from fourteen sequences.

It should also be noted, that the channel is re-estimated for each transmitted block. If the channel is slow-varying, a previous estimate can be used as a starting point for a next estimate to further reduce the required time.

Equalization Coefficient Estimation

After the impulse response is estimated, the rake receiver can be used to acquire most of the available energy of the received signal, and to mitigate the residual ISI. Therefore, after processing the training sequences for channel estimation, another training sequence is sent for equalizer coefficient estimation.

If the output of the rake receiver is x[n] when the training sequence is $ck_k$, then the equalizer coefficients can be estimated by minimizing $$\frac{1}{31}\sum_{n=0}^{30}\left|\sum_{k=-1}^{1} c_k x[n-k] - ct_n\right|.$$

Consequently $$\begin{pmatrix} c_{-1} \\ c_0 \\ c_1 \end{pmatrix} = \left(\frac{1}{31}\sum_{k=0}^{30} \vec{x}_k^* \vec{x}_k^T\right)^{-1}\left(\frac{1}{31}\sum_{k=0}^{30} \vec{x}_k^T ct_k\right),$$

where $$\vec{x}_n = \begin{pmatrix} x[n+1] \\ x[n] \\ x[n-1] \end{pmatrix}.$$

Figure 4:
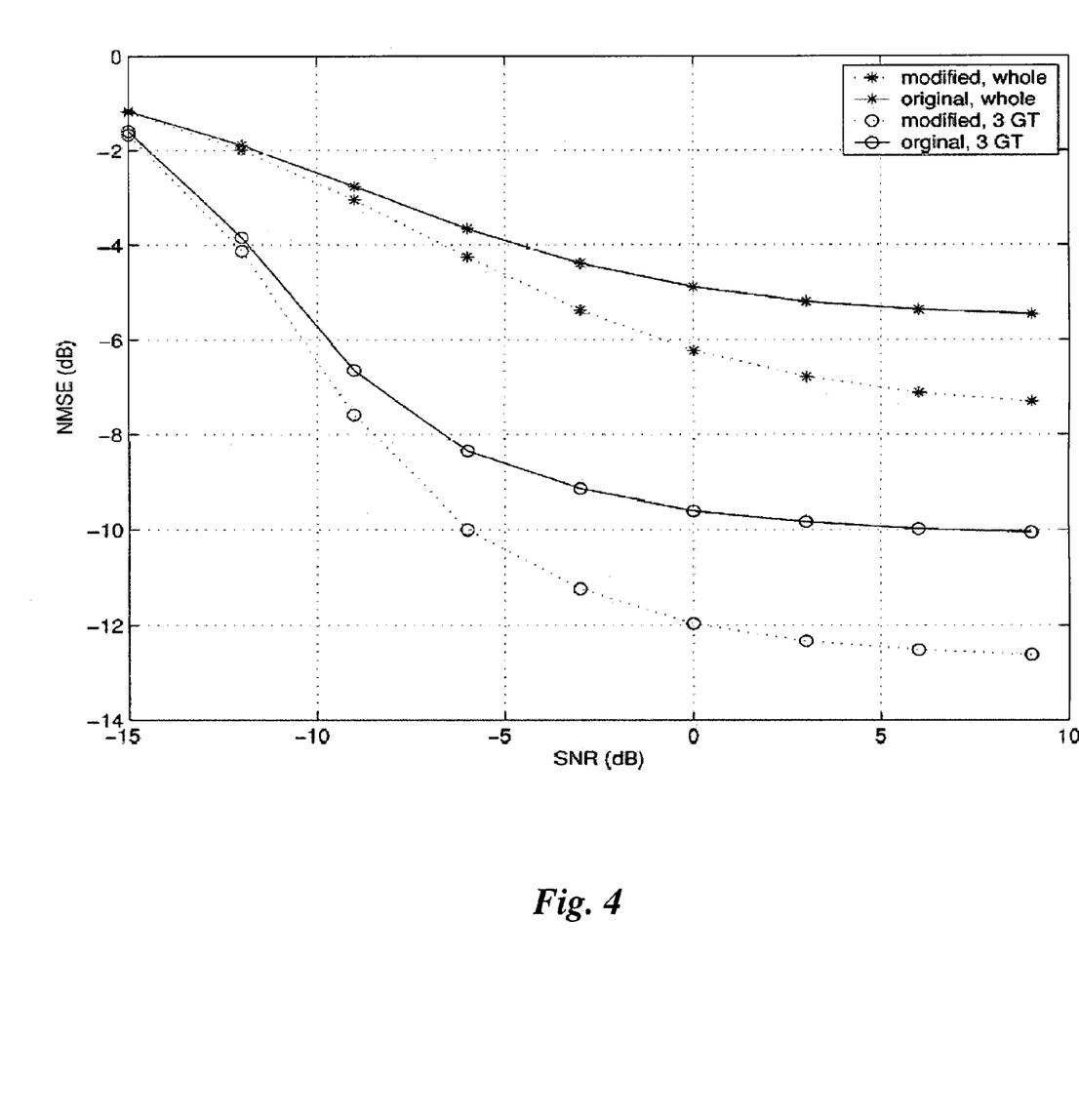
FIG. 4 is a graph comparing results obtained by the estimating according to the invention.

FIG. 4 shows results for the channel estimation according to the invention. When the SNR is below 0 dB, the normalized MSE (NMSE) of channel estimation decreases with an increase of the SNR. However, when SNR is above 0 dB, the NMSE has a floor, which is because training signal is not exciting enough.

The modified approach can significantly improve estimation performance. It can improve NMSE of overall channel estimation (whole) by 2 dB and NMSE of the three greatest taps (3-GT) by 2.6 dB.

Figure 5A:
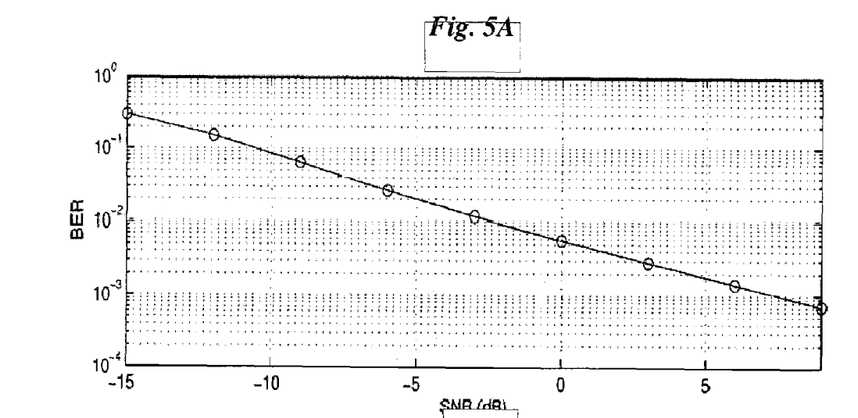
FIG. 5A is a graph showing bit error rates.
Figure 5B:
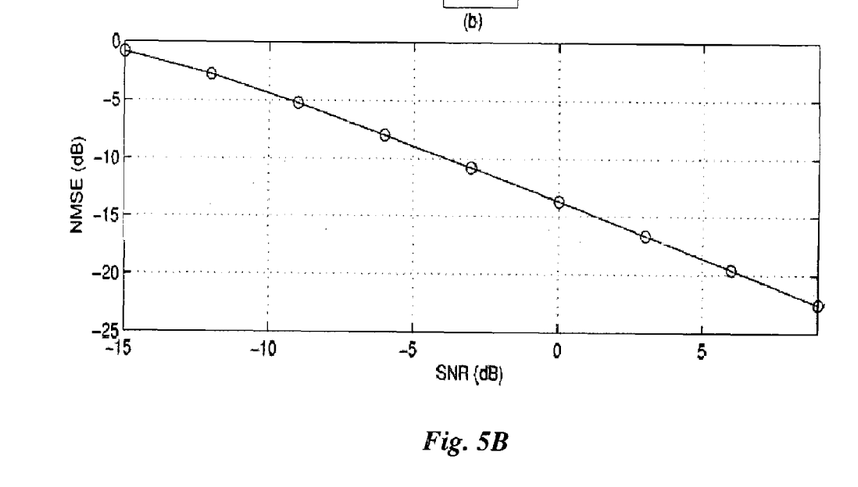
FIG. 5B is a graph showing normalized mean-square errors.

For the three-tap equalizer output according to the invention, FIG. 5A shows the bit error rate (BER), and FIG. 5A shows the normalized NMSEe. For a 1% BER, the required SNR is about −2.5 dB.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a channel impulse response in an ultra wide bandwidth (UWB) system comprising the steps of:
   generating a training sequence;
   modulating the training sequence at a chip rate to produce a modulated training sequence, the modulated training sequence being comprised of ultra wide bandwith radio pulses;
   generating a training signal comprised of a plurality of repetitions of the modulated training sequence;
   transmitting and receiving, via a channel, the training signal;
   sampling the received training signal, in parallel, with a set of correlators to obtain a plurality of samples, in which each correlator samples the received training signal at a sampling rate substantially slower than the chip rate, each correlator samples the received training signal at a different delay for each repetition of the modulated training sequence in the received training signal, and such that the plurality of samples spans a time interval corresponding to an impulse response of the channel at a resolution substantially equal to the chip rate; and
   estimating the impulse response of the channel over the time interval corresponding to the impulse response of the channel from the plurality of samples.

2. The method of claim 1, in which the training signal comprises m repetitions of the modulated training sequence, and further comprising:
   sampling, in each of n correlators, the training signal k times per repetition of the modulated training sequence in the received training signal to produce m×n×k samples of the received training signal.

3. The method of claim 1, in which the sampling rate is at least ten times slower than the chip rate.

4. The method of claim 1, in which the sampling rate is equal to a symbol rate of the training sequence.

5. The method of claim 1, further comprising:
   estimating equalizer coefficients from an equalizer training sequence consisting of radio pulses.

6. The method of claim 1, further comprising:
   estimating weights for the corresponding correlators to acquire most of the available energy of a data signal received via the channel, in which the data signal consists of ultra wide bandwith radio pulses.

7. The method of claim 1, in which a first subset of the plurality of samples are used for a rough estimate of the impulse response of the channel, and a second subset of the plurality of samples are used for an accurate estimate of the impulse response of the channel based on the rough estimate.

8. The method of claim 1, in which the estimate of the impulse response of the channel is based on a previous estimate of the impulse response of the channel.

9. The method of claim 2, where k is greater than one.

10. The method of claim 3, in which the chip rate is on the order of 10 GHz.

11. The method of claim 7, in which the second subset of the plurality of samples are obtained from training sequences received after obtaining the first subset of the plurality of samples.

12. The method of claim 2, where k is equal to one.

* * * * *